US010627614B2

(12) United States Patent
Sinha et al.

(10) Patent No.: US 10,627,614 B2
(45) Date of Patent: Apr. 21, 2020

(54) SYSTEMS AND METHODS FOR SIMULTANEOUS ACQUISITION OF MULTIPLE PLANES WITH ONE OR MORE CHROMATIC LENSES

(71) Applicant: Verily Life Sciences LLC, Mountain View, CA (US)

(72) Inventors: Supriyo Sinha, Menlo Park, CA (US); Cheng-Hsun Wu, Mountain View, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 295 days.

(21) Appl. No.: 15/471,396

(22) Filed: Mar. 28, 2017

(65) Prior Publication Data
US 2017/0293127 A1 Oct. 12, 2017

Related U.S. Application Data

(60) Provisional application No. 62/320,681, filed on Apr. 11, 2016.

(51) Int. Cl.
*G02B 21/36* (2006.01)
*G02B 21/00* (2006.01)
(52) U.S. Cl.
CPC ....... G02B 21/367 (2013.01); *G02B 21/0032* (2013.01); *G02B 21/0064* (2013.01); *G02B 21/0076* (2013.01)
(58) Field of Classification Search
CPC .............. G02B 5/04; G02B 5/1814; G02B 21/0024–0032; G02B 21/0052;
(Continued)

(56) References Cited

U.S. PATENT DOCUMENTS 5,591,981 A  1/1997 Heffelfinger et al.
6,674,572 B1 *  1/2004 Scheruebl .......... G02B 21/0024
                                                    356/237.5
(Continued)

FOREIGN PATENT DOCUMENTS

DE   102015107367 A1 * 11/2016 ........... G02B 21/006
EP      0916981 A1    5/1999
(Continued)

OTHER PUBLICATIONS

Stelzer et al., "Theory and Applications of Confocal Theta Microscopy", Zoological Studies, pp. 67-69, 1995.
(Continued)

*Primary Examiner* — Derek S. Chapel
*Assistant Examiner* — Adam W Booher
(74) *Attorney, Agent, or Firm* — McDonnell Boehnen Hulbert & Berghoff LLP

(57) ABSTRACT

Systems and methods for fluorescent microscopy are disclosed where fluorophores can be excited over an excitation band to emit light in a wide emission band. Simultaneous acquisition of multiple planes in the sample can be achieved using a modified form of confocal microscopy. In one implementation, an objective employs a lens having optics exhibiting a large degree of axial chromatic aberration, such that emissions from different axially spaced focal planes are encoded by wavelength. Advantageously, simultaneous acquisition of multiple focal planes encoded by color can be processed to obtain efficient and rapid three-dimensional imaging of a sample.

20 Claims, 3 Drawing Sheets

(58) Field of Classification Search
CPC ............ G02B 21/0064; G02B 21/0072; G02B 21/0076; G02B 21/008; G02B 21/361; G02B 21/367; G02B 27/0037; G02B 27/1013; G02B 27/46
See application file for complete search history.

(56) References Cited

U.S. PATENT DOCUMENTS

| | | |
|---|---|---|
| 2009/0309049 A1 | 12/2009 | Van Dijk et al. |
| 2010/0296106 A1* | 11/2010 | Gates .................. G02B 21/0064 356/614 |
| 2010/0314554 A1 | 12/2010 | Galimberti et al. |
| 2011/0228267 A1 | 9/2011 | Hayashi |
| 2012/0069344 A1 | 3/2012 | Liu |
| 2012/0307247 A1 | 12/2012 | Tan et al. |
| 2012/0314206 A1* | 12/2012 | Spizig .................. G02B 21/006 356/72 |
| 2013/0100525 A1 | 4/2013 | Chiang et al. |
| 2013/0329270 A1 | 12/2013 | Nielsen et al. |
| 2016/0202178 A1 | 7/2016 | Acosta |
| 2017/0089837 A1 | 3/2017 | Matsumoto et al. |
| 2017/0176338 A1 | 6/2017 | Wu et al. |
| 2018/0113292 A1* | 4/2018 | Novikau ............. G02B 21/006 |

FOREIGN PATENT DOCUMENTS

| | | |
|---|---|---|
| EP | 2720075 A1 | 4/2014 |
| GB | 859208 A | 1/1961 |
| JP | S5214417 A | 2/1977 |
| JP | S63101818 A | 5/1988 |
| JP | 2015219501 A | 12/2015 |
| WO | 2016115018 A1 | 7/2016 |

OTHER PUBLICATIONS

Olsovsky et al., "Chromatic confocal microscopy for multi-depth imaging of epithelial tissue", Biomedical Optics Express, vol. 4, No. 5, May 2013.

Weinigel et al., "Exploration of Chromatic Aberration for Multiplanar Imaging: Proof of Concept with Implications for Fast, Efficient Autofocus", Cytometry, Dec. 2009, pp. 999-1006.

Wilt et al., "Advances in Light Microscopy for Neuroscience", Annu. Rev. Neurosci., 2009.

Qing Ye et al., "High-efficiency electrically tunable phase diffraction grating based on a transparent lead magnesium niobate-lead titanite electro-optic ceramic", Optics Letters, Optical Society of America, vol. 36, No. 13, Jul. 1, 2011, pp. 2453-2455.

Yanli Zhang et al., "High-efficiency, liquid-crystal-based, controllable diffraction grating", Journal of the Optical Society of America, vol. 22, No. 11, Nov. 2005, p. 2510.

Sirleto L. et al., "Electro-Optical Switch and Continuously Tunable Filter Based on a Bragg Grating in a Planar Waveguide With a Liquid Crystal Overlayer", Optical Engineering, Soc. of Photo-Optical Instrumentation Engineers, vol. 41, No. 11, Nov. 2002, pp. 2890-2898.

International Search Report of International Application No. PCT/US2016/067684 dated Mar. 9, 2017.

International Search Report of International Application No. PCT/US2017/027510 dated Jul. 7, 2017.

International Search Report of International Application No. PCT/US2017/034875 dated Aug. 21, 2017.

International Search Report of International Application No. PCT/US2017/034877 dated Aug. 17, 2017.

* cited by examiner

SYSTEMS AND METHODS FOR SIMULTANEOUS ACQUISITION OF MULTIPLE PLANES WITH ONE OR MORE CHROMATIC LENSES

CROSS-REFERENCE TO RELATED APPLICATIONS

This application claims the benefit of and incorporates by reference the content of U.S. Provisional App. No. 62/320,681, filed Apr. 11, 2016.

BACKGROUND

The present disclosure generally relates to the field of imaging and to microscopy systems and methods. More particularly, and without limitation, the disclosed embodiments relate to systems and methods for volumetric imaging through the use of axial chromatic aberrations in an optical system.

Fluorescence microscopy uses principles of fluorescence to highlight structures for examination instead of light absorption, phase or interference effects. It can be used, for example, in biology and other disciplines for characterizing samples. Fluorescence microscopy is characterized by using incident light instead of the transmitted light employed in conventional brightfield transmitted-light microscopy. In the latter approach, light is shone on the sample and passes through it, and the effects of absorption create the image. In fluorescence microscopy, fluorophores in the sample are activated via an excitation light beam directed via the objective lens. The fluorophores emit a fluorescent light that creates the image.

When imaging thick samples, techniques can be employed to obtain images of high resolution in the axial direction. One such approach is confocal microscopy. The most common of these approaches is to use one confocal pinhole, or for higher throughput, an array of such pinholes, that rejects light emitted from planes that are outside of the focal plane. By blocking light from outside the focal plane, confocal microscopes achieve good axial resolution because the haze of out-of-focus objects is eliminated. In confocal microscopy, the excitation light source, usually a laser beam, is reflected by a dichroic filter or mirror. In scanning systems, scanning mirrors raster the beam across the sample or the sample is scanned in the transverse direction with the laser spot being fixed. The sample fluorescence light then passes back through the objective and is descanned. Thereafter, the light passes through the dichroic filter and pinhole to a photomultiplier tube detector.

A two dimensional image is generated by translating the pinholes or sample laterally. To generate a virtual volumetric image, the sample or objective is translated axially and the pinholes (or sample) are (is transversally) scanned to build up an image in that plane. This results in a significant reduction in volumetric imaging rates.

Fluorescence light sheet imaging is a technique that exhibits volumetric imaging capabilities. In this approach, a sheet of light at the excitation wavelength is sent in a plane that is perpendicular to the axis of the microscope objective lens that is collecting the light emissions. Out-of-focus light is not generated by ensuring that the thickness of the light sheet is suitably small. In this way, an entire cross-sectional plane of a sample can be captured at one time. The light sheet can be translated up and down to capture different planes.

However, conventional light sheet microscope setups have several drawbacks. For example, they are very particular, requiring access to the side of the sample as well as requiring multiple microscope objective lenses to be brought near the sample. Light sheet microscopy is, therefore, not suitable for imaging microscope slides, for example. Furthermore, the field of view of light sheet microscopes is limited.

SUMMARY

The embodiments of the present disclosure include systems and methods that improve the throughput or temporality of confocal microscopy by capturing light from several planes in the sample simultaneously. Advantageously, the exemplary embodiments allow volumetric fluorescent microscopy suitable for mature sample geometries, for example, wellplates, microscope slides, etc.

According to an exemplary embodiment of the present disclosure, a system for simultaneous acquisition of multiple planes is described, comprising an objective having a lens exhibiting axial chromatic aberration, an excitation source of excitation radiation, a confocal pinhole, a sample receptacle that receives a sample containing fluorophores responsive to the emission radiation having multiple axially spaced focal planes simultaneously projected onto an image plane, and a sensor that receives and encodes each of the axially spaced focal planes by the wavelength of the emission radiation.

According to a further exemplary embodiment of the present disclosure, a method for simultaneously obtaining an image in multiple planes is described, including the steps of providing a source of excitation radiation; exciting, with the source of excitation radiation, fluorophores of a sample over a range of wavelengths over multiple planes of interest throughout the axial depth of the sample; collecting emitted light using optics when the fluorophores relax to the ground state; wherein the optics are characterized by axial chromatic aberration such that different colors are conjugated with a pinhole at different planes.

According to a yet further exemplary embodiment of the present disclosure, a method for configuring a confocal microscope to simultaneously obtain an image in multiple planes is described, comprising the steps of providing, as part of the microscope, an objective having an axially chromatic lens; exciting fluorophores of a sample over a range of wavelengths over multiple planes of interest throughout the axial depth of the sample; and collecting emitted light using optics when the fluorophores relax to the ground state; wherein different colors are conjugated with a pinhole at different planes.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description,

DETAILED DESCRIPTION

Figure 1:
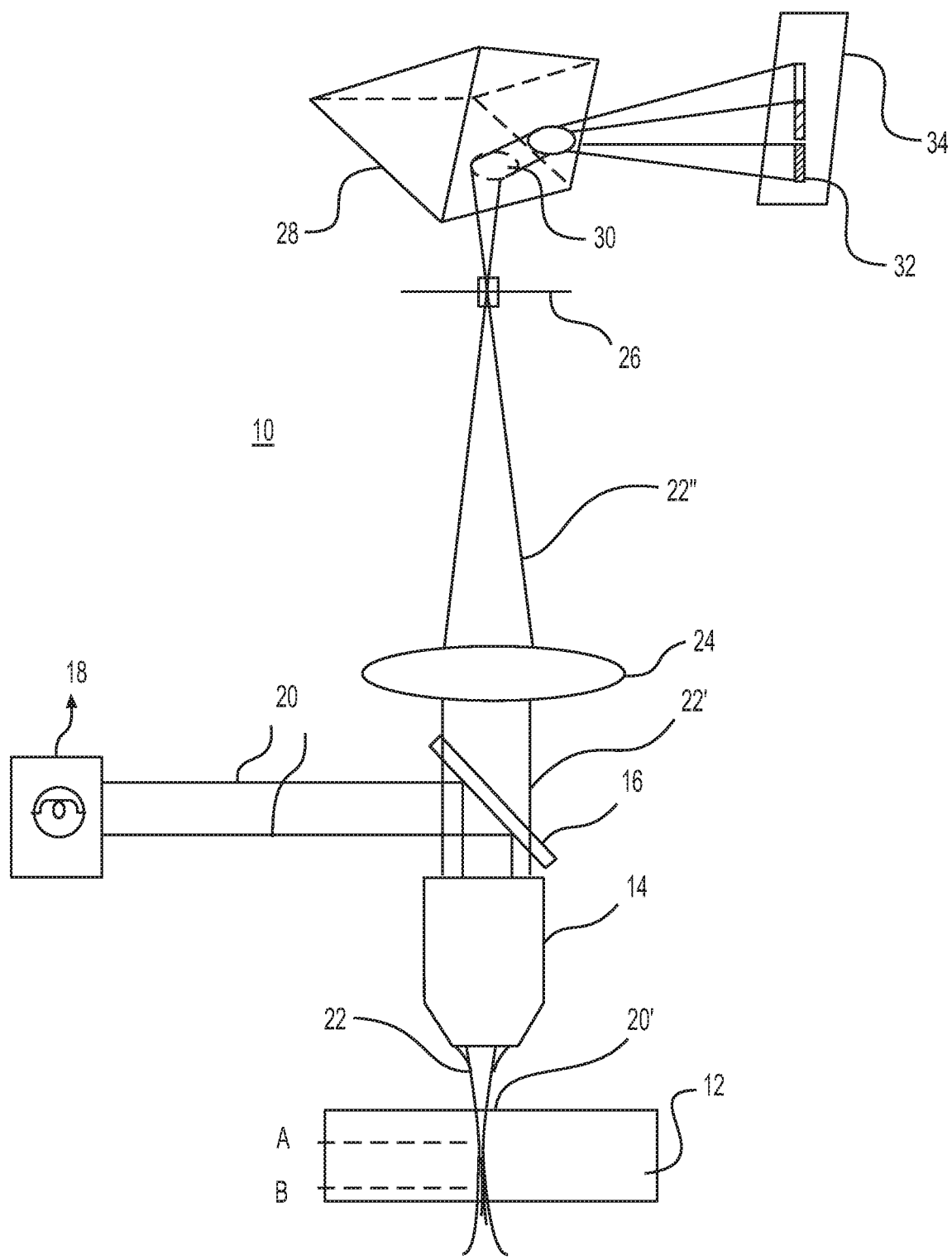
FIG. 1 is a schematic representation of an exemplary microscope system according to embodiments of the present disclosure.

The disclosed embodiments relate to systems and devices for fluorescence microscopy. Fluorophores of a sample can be excited over a range of wavelengths known as the excitation band. When they relax to the ground state, fluorophores can emit light in a wide range of wavelengths known as the emission band. This disclosure includes embodiments that employ the wide emission band of a fluorophore for simultaneous acquisition of multiple planes in the sample using a modified form of confocal microscopy.

According to an aspect of the present disclosure, an excitation spot is sent towards a sample. The excitation spot, according to the present disclosure, may be selected such that it excites the sample over all planes of interest in the axial direction. The excitation optics should be chosen such that the variation of the excitation spot size over the planes of interest is minimized.

According to an aspect of the present disclosure, the collection optics of a microscope system intentionally have a large degree of axial chromatic aberration such that different colors (i.e., different wavelengths) conjugate with an emission or confocal pinhole at different planes. Once the light has passed through the pinhole, it can be dispersed with one or more prisms, gratings or other dispersive elements, so that the spot becomes, on a two-dimensional sensor at the image plane, a streak or band as different wavelengths are dispersed from the prism at different angles, so that the vertical spatial axis of the streak contains axial image information. A given pixel location on the sensor for a given acquisition frame corresponds to a single emission wavelength, which in turn encodes the fluorescence information from a single volumetric point in the sample.

Advantageously, for each lateral position on a sample, the axial position of the image information may be encoded by color (i.e., wavelength).

In some aspects, systems according to the present disclosure maximize the axial chromatic aberrations in the optics, contrary to the standard practice of minimizing them. By introducing large focal shift as a function of wavelength, the chromatic aberrations may be used to encode axial information in the emissions. In this way, the information density on the image sensor can be greatly increased, and fast volumetric imaging may be advantageously realized.

Embodiments of the present disclosure may be also implemented using a confocal microscope having one or more two-dimensional image sensors. In contrast to using a conventional achromatic objective, microscope systems consistent with the disclosed embodiments may include an objective that is specifically engineered for chromatic aberration as discussed herein. Advantageously, these objectives may be considerably cheaper to fabricate than objectives that are designed for minimal chromatic aberration as a result of the larger optical design space.

In certain aspects, dispersion elements may be added in the collection path in microscope systems where hyperspectral capabilities are not required.

In certain aspects, chromatic aberrations may be introduced in the optical path outside of the objective. For example, a dispersive tube lens may be used as the axial chromatic element. The chromatic aberration could also be divided among several optical elements (e.g., both the objective and the tube lens). This may allow flexible selection of the objective and/or the tube lens, modification of the degrees of chromatic aberration in the microscopy system, and/or may further simplify the system or reduce the cost of the system.

Consistent with embodiments of the present disclosure, the excitation light may be made to use the chromatic aberrations to generate a very thin excitation beam. As with some embodiments of light sheet imaging, the excitation light could be made to use a Bessel beam or multiple small Bessel beams such that, instead of point excitation at the sample, line excitation is used and dispersive elements are used to convert the line(s) to a rectangle(s) on the two-dimensional sensor.

In further exemplary embodiments, digital micromirror devices or spatial light modulators (SLMs) instead of pinholes, such as in a Nipkow disk, could be used as artificial pinholes.

Reference will now be made in detail to embodiments and aspects of the present disclosure, examples of which are illustrated in the accompanying drawings. Where possible, the same reference numbers will be used throughout the drawings to refer to the same or like parts.

FIG. 1 illustrates an exemplary embodiment in schematic form of a microscope system 10. This schematic of FIG. 1 is to be understood as not being drawn to scale. In some embodiments, the microscope 10 is a fluorescence microscope, and more specifically a modified form of confocal fluorescence microscope. Embodiments of the present disclosure are applicable to other microscopy techniques, such as stimulated emission depletion (STED) microscopy for example.

As shown in FIG. 1, system 10 creates a magnified image of a sample 12 using fluorescence and/or phosphorescence through principles of optical sectioning, which are discussed further below. In an illustrative embodiment, the sample 12 is stained or dyed with a fluorophore compound, which absorbs light energy of a specific wavelength (i.e., excitation band) and re-emits light at a different wavelength (i.e., emission band). The difference between the excitation peak wavelength and the emission peak wavelength corresponds to the Stokes shift.

Various fluorophores may be used, including those known in the art. As will be appreciated, fluorophores have varying properties rendering them more or less useful for a given microscopic application. Excitation bands range from the ultraviolet through the visible spectra, and emission bands typically range from visible light into the near infrared region. New fluorophores may also offer various combinations of properties, both optical and chemical. In some embodiments, fluorophores may be linked, where a first fluorophore's emission is quenched by a companion fluorophore in a process known as fluorescence resonance energy transfer (FRET), allowing a different emission wavelength to be achieved.

Referring again to FIG. 1, sample 12 is depicted having two illustrative focal planes. In an illustrative embodiment, the first focal plane A and the second focal plane B are generally parallel to one another and perpendicular to the major optical axis of the microscope system 10. Other geometries are possible using optical elements such as lenses, mirrors, etc. Objective 14 is an optical element that gathers light (visible or otherwise) from the sample. In exemplary embodiments, the objective 14 is also used to project excitation radiation upon the sample 12. In an exemplary embodiment, objective 14 includes a chromatic lens as discussed below with reference to FIG. 2.

Dichroic filter 16 is an optical splitter element employed to permit excitation radiation 20 from an illumination source 18 to pass into the objective 14 for projection onto the sample 12 (shown at 20' in FIG. 1). The projected excitation radiation 20' can take the form of a spot, which can be of varying form, e.g., circular or elliptical. The sample 12 is penetrated by excitation radiation 20' through multiple optical planes, for illustration planes A and B, and the fluorophores are concomitantly excited. The excited fluorophores of sample 12 will subsequently emit radiation in an emission band, which in an illustrative embodiment can be across a range of wavelengths or have a plurality of wavelengths. The dichroic filter 16 permits fluorophore emissions 22 to pass through at 22' while rejecting other wavelengths, such as the excitation radiation. In an illustrative embodiment, the fluorophore emissions 22 pass through the objective 14, but other optical paths are possible.

Fluorophore emissions 22', rendered substantially parallel by the objective 14, pass into a tube lens 24, in an exemplary embodiment. The tube lens 24 brings the parallel wave trains 22' from the objective 14 originating at the focal planes of interest, e.g., focal planes A and B, into convergence at a confocal pinhole 26. Out-of-focus emissions do not pass through the confocal pinhole 26 and are eliminated from the image. The focused fluorophore emission wave trains 22" from the tube lens 24 converge at the confocal pinhole 26, and contain image information from a plurality of focal planes, e.g., focal planes A and B, and the confocal pinhole 26 can be translated axially to accommodate the parameters of investigation. In an illustrative embodiment, the objective 12 is heavily chromatic, as described below with reference to FIG. 2. In addition, a plurality of pinholes can be employed to increase throughput by obtaining an image from a different lateral position on the sample 12.

The excitation spot 20' can be laterally translated across the sample 12, and can advantageously simultaneously collect images from multiple axial planes simultaneously based on the chromatic aberrations of the lens. By employing a fluorophore having a wide emission spectrum, image wave trains at different axial depths in the sample can be encoded by wavelength, as will be discussed in greater detail below.

In an illustrative embodiment, after passing through the confocal pinhole 26, fluorophore emission wave trains 22" can be projected onto a photomultiplier detector, e.g., a CCD sensor, or an ocular lens to obtain an image. In another illustrative embodiment, once the light has passed through the pinhole 26 it can be dispersed with one or more prisms or gratings (e.g., prism 28 in FIG. 1) so that the spot 30 becomes a streak 32 on a two-dimensional sensor (not shown) at the image plane 34. The sensor could be implemented with an sCMOS sensor, although two-dimension silicon APDs arrays and other sensitive sensors could also be used. For each lateral position on the sample, the axial position can be encoded by color, which can subsequently be advantageously encoded onto the pixel number of the sensor. A three dimensional image can be formed by arranging the streaks obtained from various spots at lateral positions on the sample.

Figure 2:
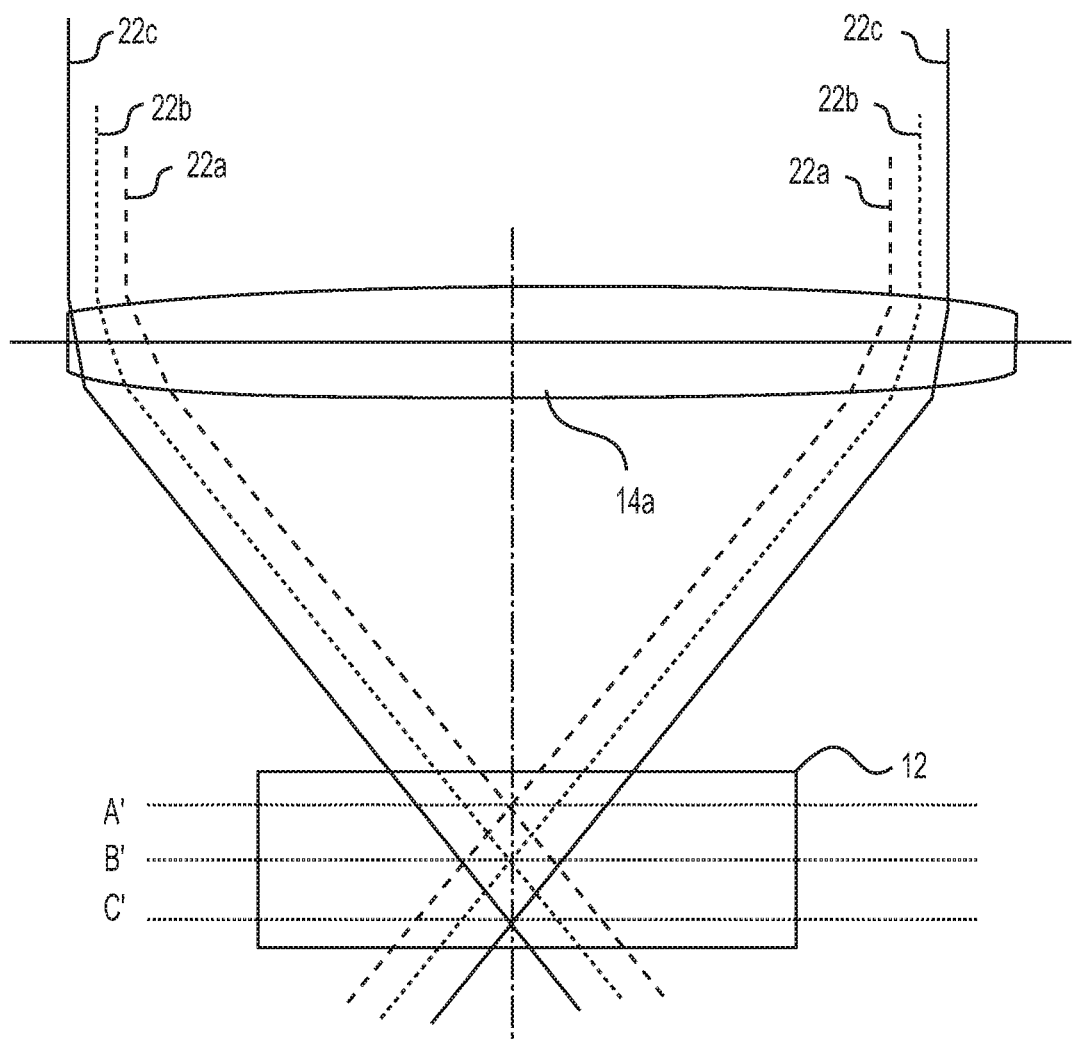
FIG. 2 is a schematic representation of an exemplary chromatic objective lens, according to embodiments of the present disclosure.

Turning to FIG. 2, a schematic representation of an exemplary chromatic lens 14a is depicted. Chromatic lens 14a is a component lens of objective 14 in illustrative embodiments. A chromatic lens achieves a separation of various frequencies on the image plane because of differences in the refractive index of the lens at different wavelengths of incident light. As depicted in FIG. 2, sample 12 has three illustrative focal planes indicated at A', B' and C'. Fluorophores present in sample 12 may have a relatively broad emission band, such that chromatic lens 14a can, by virtue of its axial chromatic optical aberration, focus light from different planes at different wavelengths, as shown in the illustrative embodiment as emission component beams 22a, 22b, and 22c. As shown, although these component beams originate at different focal planes A', B' and C', the difference in refraction of the component beams by the chromatic lens 14a, by virtue of their different wavelengths, allows the component beams to conjugate for transmission ultimately toward the image plane.

In accordance with another aspect of the present disclosure, principles of polarization can be applied to result in polarized component beams, which can be further processed for additional optical information density.

Figure 3:
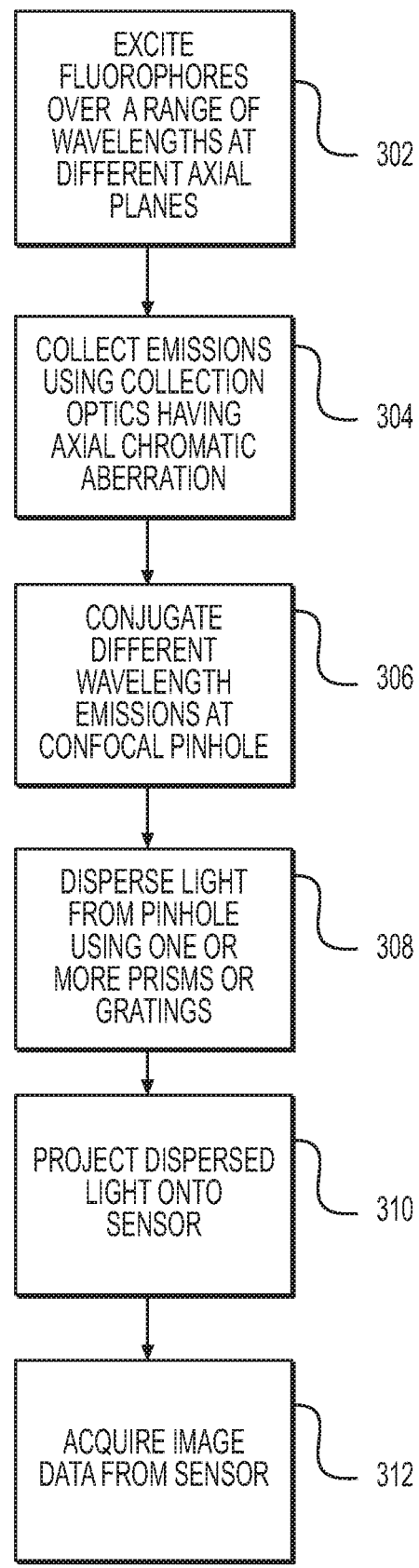
FIG. 3 is a flowchart of an exemplary method for simultaneously obtaining an image in multiple planes with an axially chromatic lens, according to embodiments of the present disclosure.

FIG. 3 is a flowchart of an exemplary method 300 for simultaneously obtaining an image in multiple planes with a microscope system with an axially chromatic lens. The illustrative method 300 using the optical system 12 and features of the embodiments of FIGS. 1 and 2, discuss above.

At step 302, fluorophores of a sample are excited over a range of wavelengths over multiple planes of interest throughout the axial depth of the sample. When the fluorophores relax to the ground state, they can emit light in a wide range of wavelengths, which are collected at step 304 using collection optics of the microscope system intentionally having a large degree of axial chromatic aberration. As a result, different colors are conjugated with an emission or confocal pinhole at different planes at step 306. At step 308, the light is dispersed with one or more prisms or gratings and the spot becomes a streak on a two-dimensional sensor at an image plane at step 310. Image data is collected from the sensor at step 312. As discussed above, for each lateral position on the sample, the axial position will be encoded by color, which may be subsequently encoded onto the pixel number of the sensor.

While illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed:

1. A microscopy system for simultaneous acquisition of multiple planes, comprising:
    an objective comprising a lens exhibiting axial chromatic aberration;
    an excitation source of excitation radiation, wherein the excitation radiation includes light within an excitation band of a specified type of fluorophore;
    a confocal pinhole;
    a sensor; and
    a sample receptacle that receives a sample containing fluorophores of the specified type of fluorophore, wherein the microscopy system provides, to the sample receptacle from the excitation source, the light within the excitation band over multiple planes of interest across an axial dimension within the sample, wherein the fluorophores emit emission radiation at multiple different wavelengths in response to illumination by the excitation radiation, wherein the light from the excitation source is not provided to the sample receptacle via the confocal pinhole, wherein the emission radiation emitted from the sample receptacle and received by the sensor is received by the sensor via the confocal pinhole and the objective, and wherein emission radiation at different wavelengths that is emitted from respective different fluorophores, that are located at respective different axially spaced focal planes within the sample receptacle, is projected onto respective different locations of the sensor according to the wavelength of the emission radiation.

2. The system of claim 1, further comprising a dichroic filter, wherein the sample receptacle receives excitation radiation from the excitation source via reflection off of the dichroic filter, and wherein the sensor receives emission radiation from the focal planes within the sample receptacle via transmission through the dichroic filter.

3. The system of claim 1, further comprising a tube lens that conjugates emission radiation from the sample receptacle toward the confocal pinhole.

4. The system of claim 1, further comprising a prism, wherein the sensor receives emission light from the confocal pinhole via the prism, and wherein the prism disperses the emission radiation received by the sensor from the confocal pinhole.

5. The system of claim 1, further comprising a grating, wherein the sensor receives emission light from the confocal pinhole via the grating, and wherein the grating disperses the emission radiation received by the sensor from the confocal pinhole.

6. The system of claim 1, wherein the sensor is calibrated for a fluorophore with a wide emission band.

7. The system of claim 6, wherein the excitation radiation includes light at more than one wavelength such that the excitation radiation is sufficient to excite a fluorophore that is located at any one of the axially spaced focal planes within the sample receptacle.

8. The system of claim 1, further comprising a tube lens that exhibits axial chromatic aberration.

9. The system of claim 8, wherein the multiple different wavelengths of the emission radiation are conjugated with the confocal pinhole at respective different planes within the sample receptacle.

10. A method for simultaneously obtaining an image in multiple planes, comprising:
    exciting, using a source of excitation radiation, multiple instances of a fluorophore within a sample that are located at multiple planes of interest across an axial dimension within the sample, wherein exciting the multiple instances of the fluorophore within the sample comprises providing excitation radiation over a range of wavelengths such that light within an excitation band of the fluorophore is provided over the multiple planes of interest;
    collecting, via a confocal pinhole and via an objective of an optical system, light emitted from the multiple instances of the fluorophore within the sample in response to being excited by the excitation radiation, wherein the light from the excitation source is not provided to the sample via the confocal pinhole, and wherein the objective comprises a lens that exhibits axial chromatic aberration such that different wavelengths of the light collected from respective different instances of the fluorophore, that are located at respective different axial planes of the multiple planes of interest, are conjugated with the confocal pinhole according to the respective different axial planes.

11. The method of claim 10, further comprising using a grating to disperse the light collected via the confocal pinhole.

12. The method of claim 10, further comprising using a prism to disperse the light collected via the confocal pinhole.

13. The method of claim 10, further comprising receiving multiple different wavelengths of the light collected via the confocal pinhole using respective different pixels of a sensor.

14. The method of claim 13, further comprising determining that a particular instance of the fluorophore within the sample is located proximate to a particular axial plane within the sample, wherein light emitted from the particular instance of the fluorophore is received by a particular pixel of the sensor, and wherein determining that the particular instance of the fluorophore within the sample is located proximate to the particular axial plane within the sample is based on a pixel number of the particular pixel.

15. The method of claim 10, wherein the collected light emitted from the sample comprises multiple different wavelengths, and wherein collected light at each of the multiple different wavelengths is projected onto a respective different location of a sensor.

16. A method for configuring a confocal microscope to simultaneously obtain an image in multiple planes, comprising:
    providing, as part of the microscope, an objective that exhibits axial chromatic aberration;
    exciting multiple instances of a fluorophore within a sample that are located at multiple planes of interest across an axial dimension within the sample, wherein exciting the multiple instances of the fluorophore within the sample comprises providing excitation radiation over a range of wavelengths; and collecting, via the objective and via a confocal pinhole of the microscope, light emitted from the multiple instances of the fluorophore within the sample in response to being excited by the excitation radiation, wherein the light from the excitation source is not provided to the sample via the confocal pinhole, and wherein the objective exhibits axial chromatic aberration such that different wavelengths of the collected light collected from respective different instances of the fluorophore, that are located at respective different axial planes of the multiple planes of interest, are conjugated with the confocal pinhole according to the respective different axial planes.

17. The method of claim 16, further comprising further comprising using at least one of a grating or a prism to disperse the light collected via the confocal pinhole.

18. The method of claim 16, further comprising receiving multiple different wavelengths of the light collected via the confocal pinhole using respective different pixels of a sensor.

19. The method of claim 18, further comprising determining that a particular instance of the fluorophore within the sample is located proximate to a particular axial plane within the sample, wherein light emitted from the particular instance of the fluorophore is received by a particular pixel of the sensor, and wherein determining that the particular instance of the fluorophore within the sample is located proximate to the particular axial plane within the sample is based on a pixel number of the particular pixel.

20. The method of claim 16, wherein the collected light emitted from the sample comprises multiple different wavelengths, and wherein collected light at each of the multiple different wavelengths is projected onto a respective different location of a sensor.

* * * * *